United States Patent
Dominguez-Montes et al.

(10) Patent No.: US 6,315,416 B1
(45) Date of Patent: Nov. 13, 2001

(54) OPTICAL SYSTEM CAPABLE OF CREATING THE THREE-DIMENSIONAL IMAGE OF AN OBJECT IN SPACE WITHOUT INVERSION

(76) Inventors: Juan Dominguez-Montes; Jesus Marcos Gomez-Martin; Jose Maria Cienfuegos-Jovellanos, all of Arroyofresno 19 Bioque A, 1° izq. Madrid (ES)

( * ) Notice: Subject to any disclaimer, the term of this patent is extended or adjusted under 35 U.S.C. 154(b) by 0 days.

(21) Appl. No.: 09/414,472

(22) Filed: Oct. 7, 1999

(30) Foreign Application Priority Data

Oct. 16, 1998 (EP) .................................................. 98500227

(51) Int. Cl.$^7$ ............................. G02B 27/22; G03B 21/28
(52) U.S. Cl. .................................. 353/99; 353/8; 359/471
(58) Field of Search ............................. 353/7, 10, 28, 353/98, 99; 359/466, 471, 477, 478, 479

(56) References Cited

U.S. PATENT DOCUMENTS

| | | | |
|---|---|---|---|
| 3,675,554 | * 7/1972 | Bonnet | 353/7 |
| 4,840,455 | * 6/1989 | Kempf . | |
| 5,499,067 | * 3/1996 | Shibazaki | 353/99 |
| 5,886,818 | * 3/1999 | Summer et al. | 353/98 |
| 5,944,403 | * 8/1999 | Krause | 353/10 |

\* cited by examiner

*Primary Examiner*—William Dowling
(74) *Attorney, Agent, or Firm*—Ladas & Parry

(57) ABSTRACT

The optical system comprises a convergent mirror ($E_c$) and a plane mirror ($E_p$), which are duly positioned in order for the focus (F) established in the optical axis (X—X) of the convergent mirror ($E_c$) in turn to be located in the sector lying between both mirrors. An object ($I_1$–$I_2$) located in an area (1) is first reflected onto the plane mirror ($E_p$) and then onto the convergent mirror ($E_c$), yielding an image ($I''_1$–$I''_2$) in an area (2) opposite the area (1) in a normal position for an observer located at a point (O) outside the system, i.e. in such a position that the signs are legible.

5 Claims, 3 Drawing Sheets

OPTICAL SYSTEM CAPABLE OF CREATING THE THREE-DIMENSIONAL IMAGE OF AN OBJECT IN SPACE WITHOUT INVERSION

OBJECT OF THE INVENTION

The invention relates to an optical system with which the three-dimensional image of a genuine object is created in space, which image is observed in its normal position, i.e. without a specular inversion.

The object of the invention is providing a very simple optical system which nevertheless allows an image to be shown in its normal position, i.e. with properly reproduced signs, the three-dimensional image being observed by merely using a concave mirror, a plane mirror and the very object, all properly positioned.

BACKGROUND OF THE INVENTION

Several optical systems are known to allow a three-dimensional image created based on an object to be seen, some of which systems are straightforward but nevertheless have the drawback that the images reproduced have their signs specularly inverted from left to right and are therefore almost illegible, all of which requires that the objects be labelled with specularly inverted characters and words and phrases be written from right to left in order to allow them to be properly read on observing the three-dimensional image.

There are also more complex optical systems which comprise a greater number of elements or more sophisticated elements, such as semi-transparent and/or polarised sheets, which may, depending on their position, generate unwanted simultaneous images of the object, of the observers themselves or of elements existing in their surroundings.

In conclusion, creating a three-dimensional image in space is achieved either with inverted signs or based on more complex systems which may generate other images along with the image of the object.

DESCRIPTION OF THE INVENTION

The system subject hereof has been devised to fully solve the aforesaid drawbacks based upon a simple and effective solution, for it overcomes the disadvantages of the simple devices or systems in which the signs are shown inverted and also overcomes the sophisticated and complex systems mentioned in the second place, providing an image in its normal position and with properly reproduced signs, based upon a structurally simple solution.

More specifically, the inventive system relies on the arrangement of two mirrors, namely a concave and a plane mirror, such that the optical axis of the concave or convergent mirror and on which its focus is contained delimits two areas, to wit an upper area where the concave or convergent mirror is precisely located, and a bottom area in which the plane mirror is located, such that the former's focus is located on the optical axis, between both mirrors, the mirrors having a reflecting surface facing their common inner area.

With this arrangement, the object for which a three-dimensional image is sought will be placed inverted, facing the reflecting surface of the plane mirror and below the optical axis of the concave or convergent mirror, thereby a three-dimensional image to be obtained on the opposite area, i.e. above the optical axis and outside the area common to both mirrors, which is the logically area where the observer is located. The three-dimensional image obtained is reproduced in its normal position and with perfectly legible signs.

As used herein, the term object should be taken to have not only its vernacular meaning, i.e. any genuine object, but also the meaning it has for optical professionals, i.e. any diffusing surface from which photons are let off, namely for instance a cathode-ray tube screen, a surface of whatever shape onto which cinematographic or TV images are projected, etc.

DESCRIPTION OF THE DRAWINGS

In order to provide a fuller description and contribute to the complete understanding of the characteristics of this invention, in accordance with a preferred embodiment thereof, a set of drawings is attached to the present specification as an integral part thereof which, while purely illustrative and not fully comprehensive, shows the following.

REFERRED EMBODIMENT OF THE INVENTION

Figure 1:
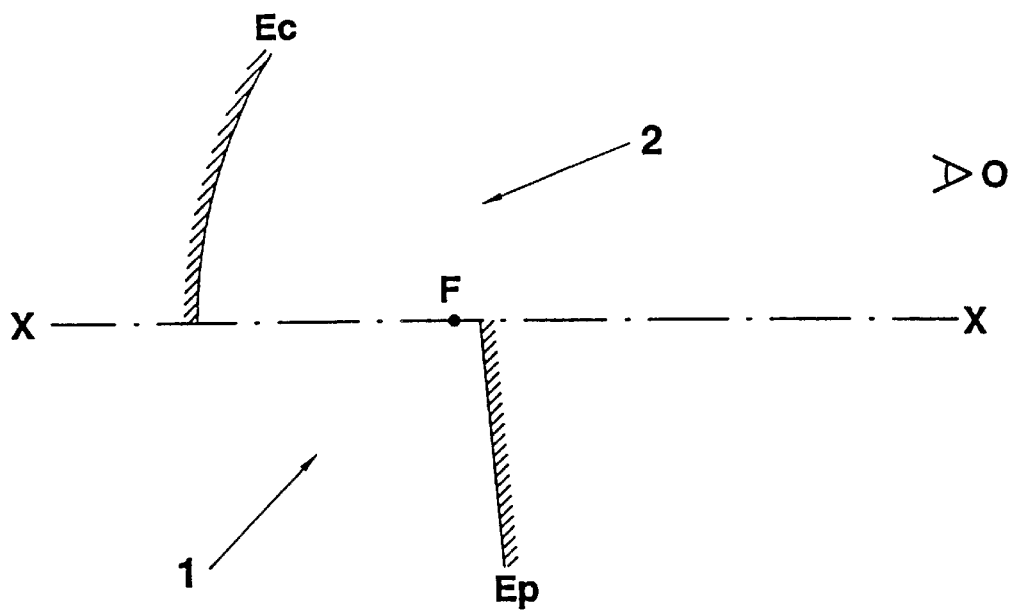
FIG. 1. Shows the arrangement of the optical system made in accordance with the object of the present invention, or in other words the position of the concave or convergent mirror and the plane mirror, along with the former's optical axis and its respective focus.

With reference to the above figures, the inventive system comprises a concave or convergent mirror ($E_c$) and a plane mirror ($E_p$), and therefore the focus (F) of said convergent mirror ($E_c$) is located on the respective optica, is (X—X) of said mirror and in the sector lying between both mirrors. The mirrors may be seen to be positioned with a slight inclination and the area generally marked (1) would be where an object for which a three-dimensional image is to be created would be positioned, such area (1) lying below the optical axis (X—X) and between both mirrors, whereas the area (2) is the area in which the three-dimensional image of the object would be created or reproduced, viewed by the observer marked (O), as is clearly shown in FIG. 1.

Figure 2:
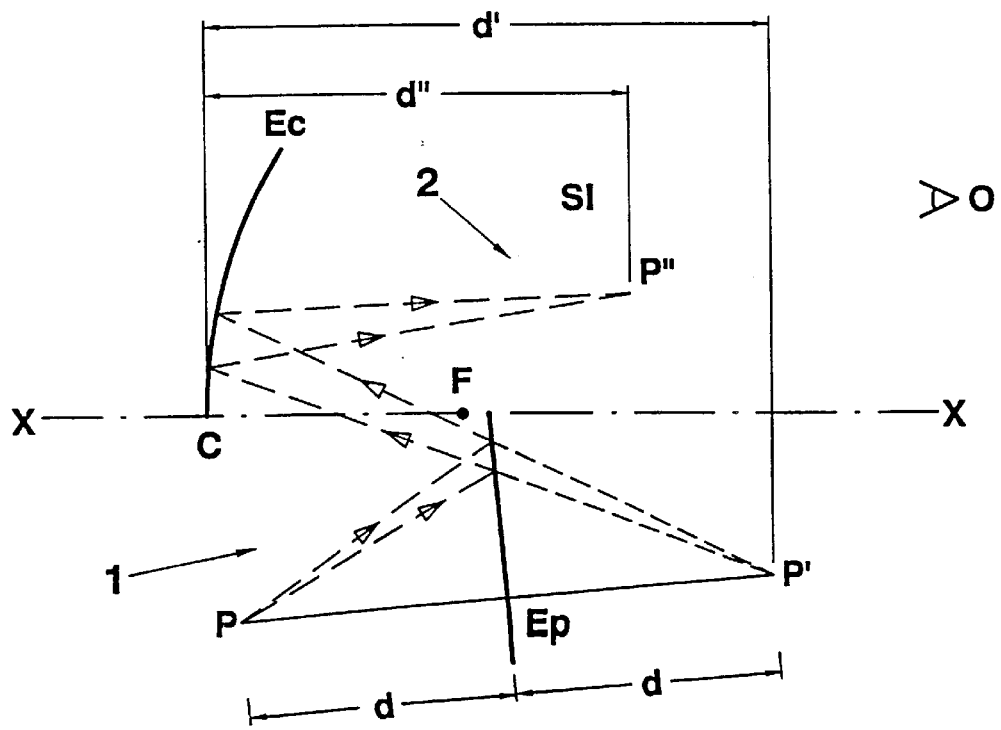
FIG. 2. Shows how the successive images of the point of an object are formed, respectively produced by the plane mirror and by the two mirrors together.

FIG. 2 shows the path followed by the light rays in forming the images of a point (p) of an object, the light rays therefore starting from point (p) and being reflected on the plane mirror ($E_p$) so as to converge at point (p') which is the image of point (p) aforesaid.

Said point or image (p') lies at the same distance (d) from mirror ($E_p$) as point (p), albeit on the opposite side of said mirror.

Furthermore, the light rays are then reflected on the convergent mirror ($E_c$), converging at point (p"), which is the image of point (p) produced by the optical system as a whole.

In paraxial conditions, the distances (d') and (d"), that is to say the distances from point (p') and image (p") to point (C), measured along axis (X—X) of mirror ($E_c$), are related by the expression:

$$\frac{1}{d''} + \frac{1}{d'} = \frac{1}{f}$$

where (f) represents the focal length of the convergent mirror ($E_c$).

Similarly, the images of all the points of the objects located in area (1) are produced in area (2).

Figure 3:
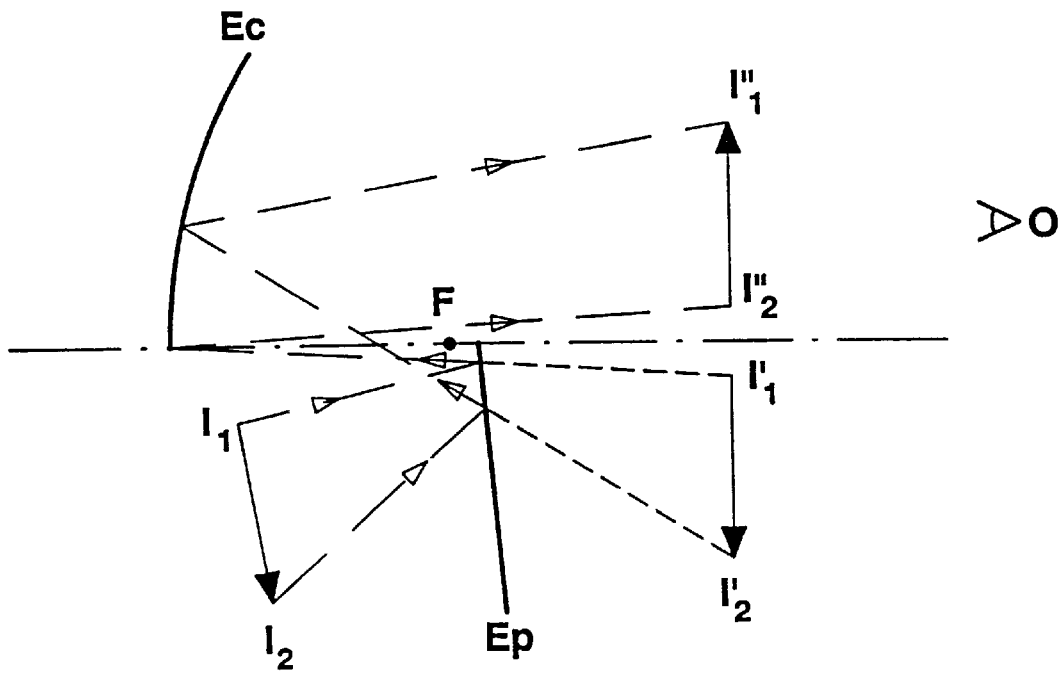
FIG. 3. Shows successive images of an object, respectively produced by the plane mirror and by the two mirrors together.

FIG. 3 shows the images ($I'_1$–$I'_2$) and ($I''_1$–$I''_2$) produced based on object ($I_1$–$I_2$), wherein the latter is located in an inverted upside down position with respect to its normal position, and may clearly be seen that image ($I'_1$–$I'_2$) has the same inverted position as the object ($I_1$–$I_2$), moreover being inverted from left to right which cannot be seen in the figure, whereas the final image ($I''_1$–$I''_2$) is formed in the normal position.

Figure 4:
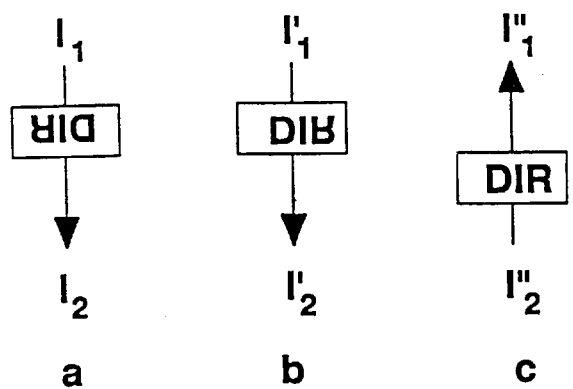
FIG. 4. Schematically shows the manner in which the central part of an object and its respective images would be seen.

FIG. 4 shows the various appearances of an object and its successive images, and it can be seen at (a) that an observer (O) lying on the side of the plane mirror ($E_p$) sees the object ($I_1$–$I_2$) in an inverted upside down position with respect to its normal position.

It may be seen in said same FIG. 4 that the image ($I'_1$–$I'_2$) of the object produced by the plane mirror is shown with the sign inverted from right to left, the observer (O) lying on the same side of the mirror as the actual object.

At (c) of this FIG. 4, an observer lying in the area (2), which is the observer's (O) area, is shown to see the final image ($I''_1$–$I''_2$) generated by the inventive optical system, after a double inversion has taken place to obtain the image of the object in its normal position, and with the sign written properly.

Figure 5:
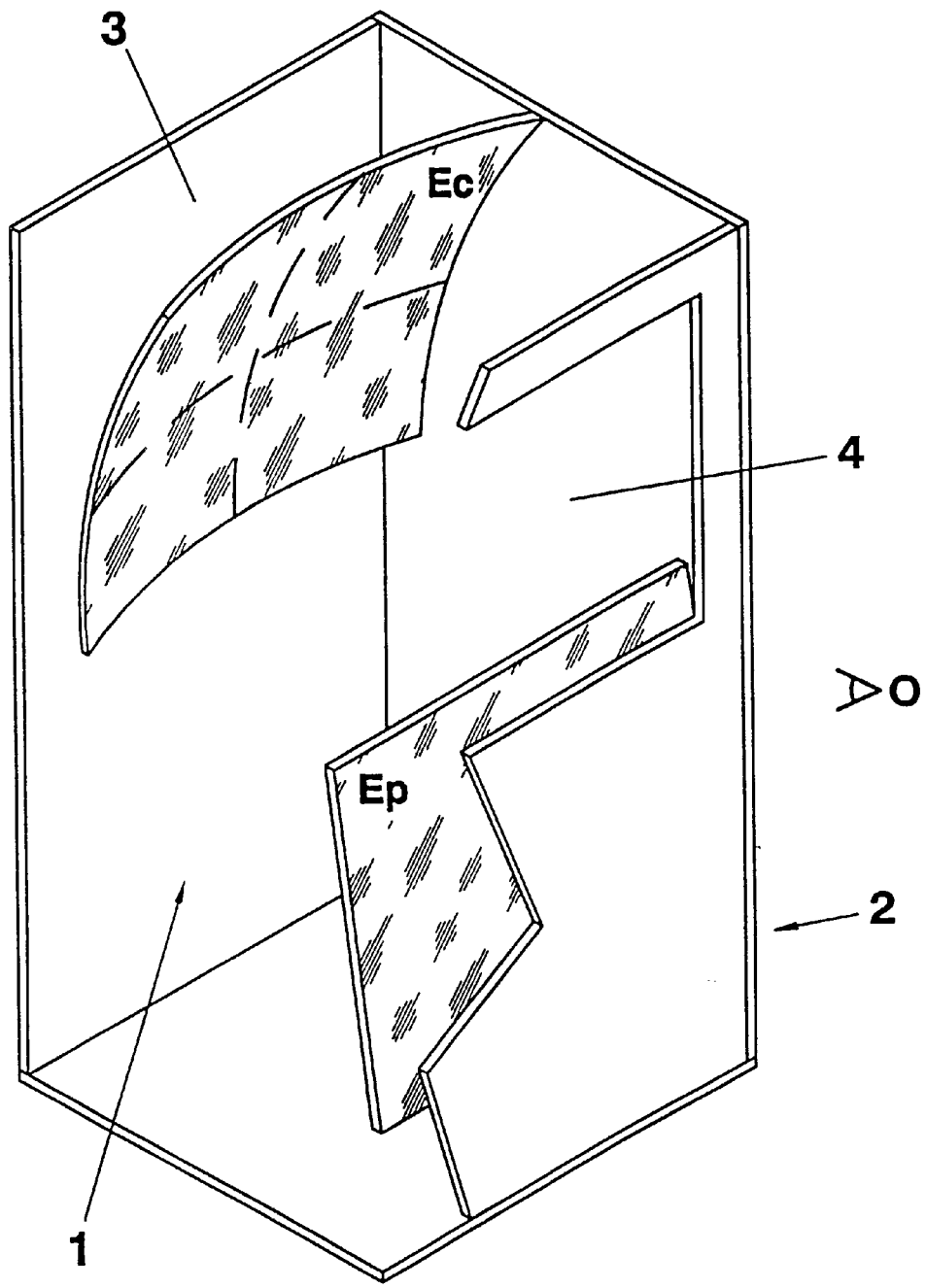
FIG. 5. Is a schematic representation of how the inventive system might conceivably be assembled within a prismatic body having a rectangular base.

In an exemplary assembly of the above-described optical system, shown in FIG. 5, said system consists of a prismatic enclosure (3) within which the concave or convergent mirror ($E_c$) and the plane mirror ($E_p$) are suitably arranged, ensuring that they are all properly positioned.

An appropriate space (1) is established within this prismatic body (3) to locate the object for which an image is to be created, being either a real object which may be supported by drive means to provide it with various movements, or an object within the optical meaning, i.e. a flat or otherwise shaped surface of a projection system or a cathode-ray tube.

The image is formed in the space (2) lying outside the enclosure as the observer's (O) area, which image is achieved based on the light rays coming from the object, through said optical system, which are projected or leave through the window (4), the image being seen in the area (2) when the observer is located at the point or in the area marked (O).

What is claimed is:

1. An optical system, comprising:
   a plane mirror for reflection in a first direction, the plane mirror having an end; and
   a convergent-reflection mirror for reflection in a second direction generally opposite the first direction, the convergent-reflection mirror having an end for defining an axis connecting the end of the convergent-reflection mirror and the end of the plane mirror, the plane mirror being on one side of the axis and the convergent-reflection mirror being on an opposite side of the axis,
   wherein a focus of the convergent-reflection mirror is on the axis and between the mirrors, and
   wherein the first and second directions are such that an object on the one side of the axis for reflection from the plane mirror in the first direction is reflected onto the convergent-reflection mirror for reflection in the second direction to an observation point on the opposite side of the axis.

2. The optical system as in claim 1, and further comprising a rectangular prismatic body (1) for receiving the mirrors ($E_p$, $E_c$) and the object (P) and having a first wall (3) on which the convergent-reflection mirror ($E_c$) is positioned and a window (4) in a second wall opposite the first wall (3) to the observation point outside the body (3).

3. The optical system as in claim 1, and further comprising a diffusing surface for providing the object.

4. The optical system as in claim 2, and further comprising a diffusing surface for providing the object.

5. The optical system as in claim 4, wherein the diffusing surface is inside the body.

* * * * *